United States Patent
Spindler et al.

(10) Patent No.: US 7,202,319 B2
(45) Date of Patent: Apr. 10, 2007

(54) WATER-SOLUBLE COPOLYMERS BASED ON OLEFINIC SULFONIC ACIDS, METHOD FOR THE PRODUCTION THEREOF AND USE OF THE SAME

(75) Inventors: Christian Spindler, Wasserburg (DE); Johann Plank, Trostberg (DE); Andrea Fenchl, Wasserburg (DE); Uwe Huber, Garching (DE)

(73) Assignee: BASF Construction Polymers GmbH (DE)

( * ) Notice: Subject to any disclaimer, the term of this patent is extended or adjusted under 35 U.S.C. 154(b) by 347 days.

(21) Appl. No.: 10/510,855

(22) PCT Filed: Apr. 9, 2003

(86) PCT No.: PCT/EP03/03694

§ 371 (c)(1),
(2), (4) Date: Oct. 12, 2004

(87) PCT Pub. No.: WO03/085013

PCT Pub. Date: Oct. 16, 2003

(65) Prior Publication Data

US 2005/0143543 A1      Jun. 30, 2005

(30) Foreign Application Priority Data

Apr. 10, 2002   (DE) ................. 102 15 682

(51) Int. Cl.
*C08F 26/08*   (2006.01)
(52) U.S. Cl. .................. 526/288; 526/264; 526/271; 526/287; 526/318.2; 526/332; 524/831; 524/832
(58) Field of Classification Search ............... 526/264, 526/271, 287, 288, 318.2, 332; 524/831, 524/832
See application file for complete search history.

(56) References Cited

U.S. PATENT DOCUMENTS 5,919,300 A * 7/1999 Burge et al. ............... 106/727

FOREIGN PATENT DOCUMENTS

JP          9-295913       * 11/1997

* cited by examiner

*Primary Examiner*—Helen L. Pezzuto
(74) *Attorney, Agent, or Firm*—Fitch, Even, Tabin & Flannery

(57) ABSTRACT

Water-soluble copolymers based on olefinic sulfonic acids, olefinic dicarboxylic acids, vinyl amides and vinyl ethers and/or allyl ethers and/or bisacryl derivatives are described as well as processes for their production and the use of these copolymers as water retention agents, thickeners or anti-segregation agents for aqueous building material systems that contain hydraulic binding agents such as cement, lime, gypsum, anhydrite etc. or for clay suspensions preferably based on bentonite.

21 Claims, No Drawings

WATER-SOLUBLE COPOLYMERS BASED ON OLEFINIC SULFONIC ACIDS, METHOD FOR THE PRODUCTION THEREOF AND USE OF THE SAME

The present invention concerns water-soluble copolymers based on olefinic sulfonic acids, olefinic dicarboxylic acids, vinylamides and vinyl and/or allyl ethers which can be used as water retention agents, thickeners or anti-segregation agents in plaster and cement mortars that are for example used in the form of plasters, and in clay suspensions.

Cement and plaster mortars are used in the building industry to bond various ceramic materials and surface coverings to the substrate or to cover surfaces (plaster). In this process the tempering water must be prevented from being removed from the mortar by capillary forces of porous substrates. This is achieved by adding water retention agents. These can either bind water per se due to their chemical structure (e.g. by means of hydrogen bonds) or they result in the formation of an impermeable filter cake of the mortar on the substrate. Thus for example mixtures of clay and guar are described as water retention agents in EP-A 1 090 889. The documents DE 195 43 304 A1 and U.S. Pat. No. 5,372,642 disclose cellulose derivatives as water retention agents.

Furthermore setting agents are often added to mortars to prevent the mortar from flowing out of cracks to be repaired or from vertical surfaces. This is often achieved by adding cellulose and/or starch derivatives. Thus setting agents which contain at least one cellulose ether and one starch ether are disclosed in EP-A 773 198. According to EP-A 0 445 653 and DE 195 34 719 A1 setting agents are described which contain the clay mineral hectorite in addition to cellulose derivatives. Thickener systems are known from EP-A 0 630 871 which contain at least one ionic or non-ionic surfactant in addition to a cellulose ether.

Suspensions of swellable clays are used in foundation and soil engineering to produce earth-supporting liquids for excavations. Examples of this are the construction of diaphragm walls, and the sinking of shafts, wells and caissons (see also: F. Weiss, "Die Standfestigkeit flüssigkeitsgestützter Erdwände" in "Bauingenieurpraxis" 70 (1967)).

The cellulose derivatives used according to the prior art have the disadvantage that they delay the stiffening of cement mortar. However, this is undesirable in many cases since a relatively rapid stiffening of the mortar is better for subsequent treatment. For this reason it is often necessary to additionally add accelerators to cement slurries which, however, is not unproblematic in practice due to the necessity of an exact dosage.

Hence the object of the present invention was to provide water-soluble copolymers which do not have the said disadvantages of the prior art, but can be produced in a technically simple manner and give the corresponding building material systems good application properties in the working and hardened state.

This object was achieved by the copolymers according to claim 1.

It has surprisingly turned out that the water-soluble copolymers according to the invention can be used as water retention agents, thickeners or anti-segregation agents without prolonging the setting and stiffening times.

The copolymers according to the present invention consist of at least four structural units a), b), c) and d). The first structural unit a) is derived from olefinic sulfonic acids of formula (Ia) and/or (Ib):

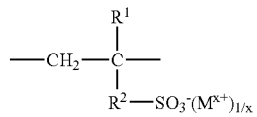

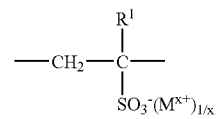

in which
$R^1$=hydrogen or $C_1$–$C_5$ alkyl,
$R^2$=$C_1$–$C_{20}$ alkylene, carboxy-$C_1$–$C_{20}$-alkylene, carboamido-$C_1$–$C_{20}$-alkylene or phenylene
M=hydrogen, ammonium or a monovalent, divalent or trivalent metal cation
and
x=1 to 3.

Alkali ions and in particular sodium and potassium ions are preferably used as monovalent metal cations; alkaline earth ions and in particular calcium and magnesium ions are preferably used as divalent metal cations and aluminium or iron ions are preferably used as trivalent cations. According to a preferred embodiment $R^1$=hydrogen and $R^2$=—CO—NH—C(CH$_3$)$_2$—CH$_2$— in formula (Ia).

The structural unit a) is derived from monomers such as 2-acrylamido-2-methylpropanesulfonic acid, styrenesulfonic acid, vinylsulfonic acid and methallylsulfonic acid and salts thereof. 2-Acrylamido-2-methylpropanesulfonic acid and salts thereof are particularly preferred.

The second structural unit b) corresponds to formula (IIa) and/or (IIb):

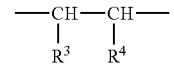

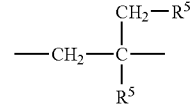

in which
$R^3$ and $R^4$=—COO$^-$(M$^{x+}$)$_{1/x}$ or are together

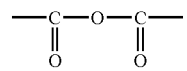

$R^5$=—COO$^-$(M$^{x+}$)$_{1/x}$
M=hydrogen, ammonium or a monovalent, divalent or trivalent metal cation
and
x=1 to 3.

Again alkali cations (Na, K) are preferred as monovalent metal cations, alkaline earth cations (Ca, Mg) are preferred as divalent metal cations and aluminium and iron ions are preferred as trivalent metal cations.

Maleic acid and salts thereof as well as maleic anhydride and also fumaric acid, itaconic acid or salts thereof are suitable as monomers which form the structure(s) (IIa) and/or (IIb).

The third structural unit c) corresponds to formula (III).

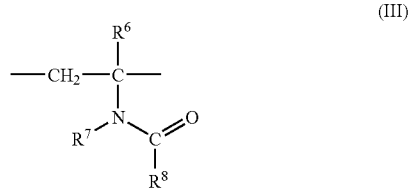

in which
$R^6$=hydrogen or $C_1$–$C_5$ alkyl
$R^7$ and $R^8$=hydrogen, $C_1$–$C_{10}$ alkyl or are together —$(CH_2)_y$— and
y=3 to 7, in particular 3 to 5.

N-vinylcaprolactam, N-vinylpyrrolidone and also N-vinylformamide, N-vinylacetamide and N-methyl-N-vinylacetamide are preferably used as monomers that can form the structural unit c).

The fourth structural unit d) corresponds to formula (IVa) and/or (IVb) and/or (IVc):

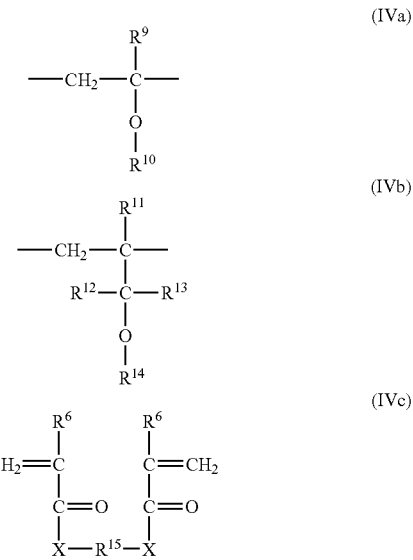

in which
$R^9$=hydrogen or $C_1$–$C_5$ alkyl
$R^{10}$=$C_1$–$C_{10}$ alkyl, $C_1$–$C_{10}$ aminoalkyl, $C_1$–$C_{20}$ hydroxyalkyl, $C_1$–$C_4$alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl
$R^{11}$, $R^{12}$ and $R^{13}$=hydrogen or $C_1$–$C_5$ alkyl and
$R^{14}$=hydrogen, $C_1$–$C_{20}$ alkyl, $C_1$–$C_{10}$ aminoalkyl, $C_1$–$C_{20}$ hydroxyalkyl, $C_1$–$C_4$ alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or $C_1$–$C_{20}$ alkylenesulfonic acids optionally substituted with hydroxyl group(s) e.g. with 1 to 3 hydroxyl groups, and ammonium, alkali or alkaline earth salts thereof

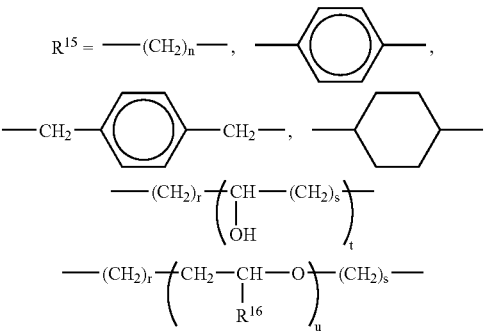

X=O, NH
n=1 to 6
r, s=0 to 5
t=1 or 2
u=1 to 50
and
$R^6$ has the above-mentioned meaning.

According to a preferred embodiment the $C_1$–$C_{20}$ hydroxyalkyl, $C_7$–$C_{20}$ hydroxyalkylaryl and $C_6$–$C_{10}$ hydroxylaryl residues for $R^{10}$ and $R^4$ in formulae (IVa) and/or (IVb) have one or more e.g. 2 to 5 and in particular 2 to 3 hydroxyl groups.

Furthermore in formula (IVa), $R^9$ preferably represents hydrogen and $R^{10}$ represents a $C_1$–$C_{16}$ hydroxyalkyl or a methyl- or hydroxyl-terminated mono- or poly-$C_2$–$C_3$ alkyleneoxy residue.

Finally $R^{11}$, $R^{12}$ and $R^{13}$ in formula (IVb) preferably denote hydrogen and $R^{14}$ preferably denotes 2,3-dihydroxypropyl, 3-hydroxypropyl or 2-hydroxypropyl-3-sulfonic acid and ammonium, alkali and alkaline earth salts thereof.

The monomers which form the structural unit (IVa) are preferably hydroxybutylvinyl ether, diethyleneglycolvinyl ether, vinyloxobutylene polyethylene glycol, (with a hydroxy or alkyl terminus), 2-aminoethylvinyl ether, glycidylvinyl ether and butyl- or isobutylvinyl ether.

Monomers which form the structural unit (IVb) are preferably 3-allyloxy-2-hydroxypropane-1-sulfonic acid and salts thereof, 3-allyloxy-1,2-propanediol, allylglycidyl ether, allylethyl ether, 2-allyloxyethanol and 1,1,1-tris(hydroxymethylpropane)monoallyl ether.

Monomers which form the structural unit (IVc) are preferably bis-acrylamides and bis-acrylic acid esters which are linked together by means of alkylidene, phenylene, benzylidene, cyclohexylidene, hydroxyalkylene or oxyalkylene groups.

The fact that the copolymers contain 5 to 93 wt.-% of the structural units a), 1 to 50 wt.-% of the structural units b), 5 to 93 wt.-% of the structural units c) and 1 to 25 wt.-% of the structural units d) where the components a) to d) add up to 100 wt.-% is regarded as being fundamental to the invention.

Preferably used copolymers contain 40 to 83 wt.-% of the structural units a), 5 to 48 wt.-% of the structural units b), 5 to 53 wt.-% of the structural units c) and 1 to 10 wt.-% of the structural units d), where a), b), c) and d) amount to 100 wt.-%.

The number of repeating structural units in the copolymers according to the invention is unlimited. However, it has proven to be advantageous to adjust the number of structural units such that the copolymers have a molecular weight of 10,000 to 3,000,000 g/mol and in particular of 100,000 to 1,000,000 g/mol.

The copolymers according to the invention can be produced by a number of polymerization processes. Bulk, solution and inverse emulsion polymerization, as well as suspension polymerization in an organic continuous phase, precipitation polymerization and gel polymerization are suitable for their production. It is preferable to polymerize in solution or to use gel polymerization for their synthesis especially preferably in water as a solvent.

Hence the invention concerns a process for producing the copolymers according to the invention in which monomers of formula (Ia) and/or (Ib)

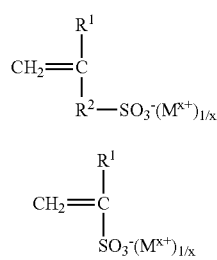

in which $R^1$=hydrogen or $C_1$–$C_5$ alkyl, $R^2$=$C_1$–$C_{20}$ alkylene, carboxy-$C_1$–$C_{20}$-alkylene, carboamido-$C_1$–$C_{20}$-alkylene or phenylene M=hydrogen, ammonium or a monovalent, divalent or trivalent metal cation and x=1 to 3, especially in an amount of 5 to 93 wt.-% and of formula (IIa) and/or (IIb)

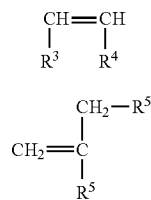

in which $R^3$ and $R^4$=—COO$^-$(M$^{x+}$)$_{1/x}$ or are together

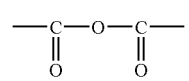

$R^5$=COO$^-$(M$^{x+}$)$_{1/x}$

M=hydrogen, ammonium or a monovalent, divalent or trivalent metal cation and x=1 to 3, especially in an amount of 1 to 50 wt.-%, and of formula (III)

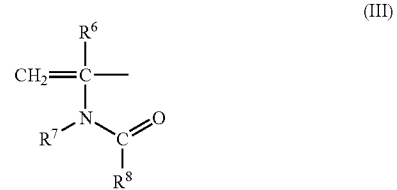

in which $R^6$=hydrogen or $C_1$–$C_5$ alkyl $R^7$ and $R^8$=hydrogen or $C_1$–$C_{10}$ alkyl or are together —(CH$_2$)$_y$— and y=3 to 7, especially in an amount of 5 to 93 wt.-%, and of formula (IVa) and/or (IVb) and/or (IVc), especially in an amount of 1 to 25 wt.-%:

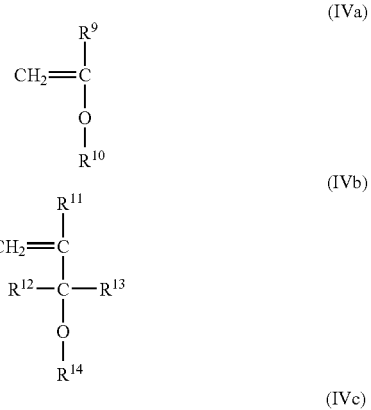

in which $R^9$=hydrogen or $C_1$–$C_5$ alkyl $R^{10}$=$C_1$–$C_{10}$ alkyl, $C_1$–$C_{10}$ aminoalkyl, $C_1$–$C_{20}$ hydroxyalkyl, $C_1$–$C_4$ alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl $R^{11}$, $R^{12}$ and $R^{13}$=hydrogen or $C_1$–$C_5$ alkyl and $R^{14}$: hydrogen, $C_1$–$C_{20}$ alkyl, $C_1$–$C_{10}$ aminoalkyl, $C_1$–$C_{20}$ hydroxyalkyl, $C_1$–$C_4$ alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or $C_1$–$C_{20}$ alkylenesulfonic acids optionally substituted with hydroxyl group(s), and ammonium, alkali or earth alkaline earth salts thereof

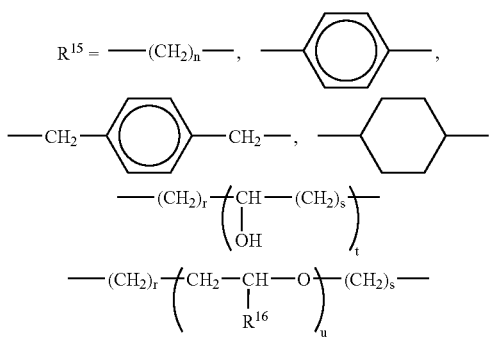

$R^{16}$=H, $CH_3$
X=O, NH
n=1 to 6
r, s=0 to 5
t=1 or 2
u=1 to 50
and
$R^6$ has the above-mentioned meaning, are polymerized in bulk or in solution at temperatures of −5 to 120° C.

For the inverse emulsion polymerization of the copolymers according to the invention, the monomers are dissolved in the aqueous phase and emulsified with the aid of a protective colloid in a standard organic solvent such as cyclohexane, toluene, heptane, petroleum ether or mineral oils and started with the aid of a commercial initiator that is soluble in organic solvents such as dibenzoyl peroxide or azoisobutyronitrile.

Suspension polymerization in an organic continuous phase differs from the inverse emulsion polymerization with respect to the selected initiator where a water-soluble initiator system is used. The polymer particles that are obtained in this process are often larger than in inverse emulsion polymerization.

If the copolymers according to the invention are synthesized by a precipitation polymerization process, then water-soluble $C_1$–$C_5$ alkanols such as methanol, ethanol or tert.-butanol are particularly suitable as solvents. Especially the latter is preferred due to its low chain-transfer constant if it is intended to produce polymers having a large molecular weight. During the precipitation polymerization the polymer precipitates as a powder and can be isolated by simple filtration.

If it is intended to achieve high molecular weights, gel polymerization is particularly well suited. In this process the monomer is dissolved in a solvent and the monomer content of the aqueous solution is usually 25 to 75 wt.-%. Polymerization results in a high-molecular weight gel which can subsequently be reduced to small pieces and dried.

All polymerizations are started in a temperature range of −5 to 120° C. A start temperature between 5 and 90° C. is preferred. The reactions can be carried out under normal pressure or elevated pressure. Initiation and polymerization in an atmosphere of protective gas is advantageous in some cases.

The polymerization can be initiated in various ways. It can be started thermally by suitable initiators in which case azo compounds are preferably used. Initiation by initiators suitable for photochemical degradation is also possible. α-Substituted carbonyl compounds such as benzoin or benzil derivatives are preferably used. A photo-sensitizer can optionally be added to these light-sensitive initiators.

Many polymerization processes for producing the copolymers according to the invention result in high molecular weights. Lower molecular weights are obtained by adding substances with large chain-transfer constants to the reaction solution. Multi-functional amines such as tetraethylene pentamine, alcohols such as methanol, ethanol or isopropanol and mercaptans such as mercaptoethanol are preferred in this case. The use of allyl ethers as comonomers also results in products with comparatively low molecular weights.

Depending on the process used, the polymerizations can proceed with various degrees of exothermy. The heat generated at the start of polymerization can be reduced by adding suitable moderators in which case alkylamines are preferably used for this.

The polymer compounds according to the invention are excellently suitable as water retention agents, thickeners or anti-segregation agents for aqueous building material systems containing mineral binding agents such as cement, lime, gypsum and anhydrite etc. or for clay suspensions preferably based on bentonite.

The copolymers according to the invention are preferably and usually used in amounts between 0.05 and 5% by weight based on the dry weight of the building material system.

The copolymers according to the invention have excellent water retention, thickening and anti-segregation properties without prolonging the setting and stiffening properties.

The following examples are intended to further elucidate the invention.

EXAMPLES

Production Examples

Example 1

11.9 g calcium hydroxide was suspended in 200 g tap water, 61.3 g AMPS and 3.2 g maleic anhydride were added and the pH was adjusted to 8 with additional calcium hydroxide. 7 g N-vinylpyrrolidone and 1.6 g 3-allyloxy-2,3-epoxypropane were subsequently added, the reaction solution was flushed with nitrogen and heated to 50° C. After adding 0.3 g 2,2'-azobis(N,N'-dimethyleneisobutyramidine) dihydrochloride, the reaction was stirred for 3 hours at 50° C.

Example 2

11.9 g calcium hydroxide was suspended in 200 g tap water, 61.3 g AMPS and 1.6 g maleic anhydride were added and the pH was adjusted to 6 with additional calcium hydroxide. 8.6 g N-vinylcaprolactam was subsequently added, the reaction solution was flushed with nitrogen and heated to 50° C. After adding 4,4 g vinyloxy-butylene polyethylene glycol (MW ca. 500 g/mol) and 0.3 g 2,2'-azobis(2-amidinopropane)dihydrochloride, the reaction was stirred for 3 hours at 50° C.

Example 3 (Gel Polymerization)

14.34 g sodium hydroxide was suspended in 200 g tap water, 61.3 g AMPS and 2.9 g maleic anhydride were added and the pH was adjusted to 8 with additional sodium hydroxide. 15 g N-vinylacetamide and 21.3 g N-vinylformamide were subsequently added, the reaction solution was flushed with nitrogen and heated to 55° C. After adding 4.6 g of a 40% solution of 3-allyl-2-hydroxypropanesulfonic acid, sodium salt and 0.3 g 2,2'-azobis(2-amidinopropane) dihydrochloride, the reaction was allowed to stand for 3 hours at 55° C.

Example 4

64 g calcium hydroxide was suspended in 800 g tap water, 245 g AMPS and 23 g maleic anhydride were added and the pH was adjusted to 8 with additional calcium hydroxide. 34 g N-vinylcaprolactam was subsequently added, the reaction solution was flushed with nitrogen and heated to 60° C. After adding 6 g hydroxybutylvinyl ether and 1.2 g 2,2'-azobis(2-amidinopropane)dihydrochloride, the reaction was stirred for 3 hours at 60° C.

Example 5

11.6 g calcium hydroxide was suspended in 200 g tap water, 61.3 g AMPS and 1.2 g maleic anhydride were added and the pH was adjusted to 8 with additional calcium hydroxide. 25.8 g N-vinylcaprolactam and 1.4 g methylene bisacrylamide were subsequently added, the reaction solution was flushed with nitrogen and heated to 62° C. After adding 0.6 g tetraethylene pentamine and 0.85 g sodium persulfate, the reaction was stirred for 3 hours at 60° C.

Examples of Application

The copolymers according to the invention were examined with regard to their suitability as anti-segregation agents, thickeners and water retention agents for plaster pastes, cement slurries and clay suspensions.

Example 6

The effect of the polymers according to the invention as anti-segregation agents for cement slurries was determined according to DIN EN 480-4. For this 1500 g cement CEM I 42.5 R was mixed with 900 g tap water and 7.5 g polymer, 900 ml was filled into a measuring cylinder, the bleed water was withdrawn after certain times and its mass in g was determined. The following accumulated values were obtained (table 1):

TABLE 1

Bleed water values for CEM I 42.5 R cement
(w/c = 0.6; 0.5 wt-% polymer relative to cement)

| Polymer | Bleed water (g) after | | |
|---|---|---|---|
| | 10 min | 60 min | 120 min |
| — | 3.9 | 75.1 | 134.4 |
| 1 | 0.1 | 0.2 | 0.2 |
| 2 | 0.2 | 0.2 | 0.2 |
| 3 | 0.2 | 0.2 | 0.2 |
| 4 | 0.7 | 0.8 | 0.8 |

Example 7

The polymers according to the invention are also suitable as water retention agents for cement slurries. The water retention capacity of the cement slurries treated with the polymers according to the invention was determined according to DIN 18 555. 350 g CEM I 42.5 R cement was mixed with 210 g tap water and 2.5 g polymer and homogenized. The results obtained are shown in table 2.

TABLE 2

Water retention capacity of the described polymers according to the invention in CEM I 42.5 R cement slurries

| Polymer | water retention capacity (%) |
|---|---|
| — | 64.8 |
| 1 | 98.2 |
| 2 | 98.4 |
| 3 | 99.0 |
| 4 | 97.8 |
| 5 | 89.5 |

Example 8

The thickening action of the polymers according to the invention on cement slurries was determined with the aid of the flow index. A commercial methyl cellulose was selected as the reference. 0.75 g polymer was dissolved in 180 g tap water and 300 g cement CEM I 42.5 R was subsequently added. The slurries were allowed to stand for 60 sec and afterwards stirred vigorously for 120 sec. The slurries were poured into a Vicat ring (H=40 mm, $d_{small}$=65 mm, $d_{large}$=75 mm) standing on a glass plate to the level of the rim. The Vicat ring was lifted 2 cm and held for about 5 sec above the slurries that flowed out. The diameter of the slurries that had flown out was measured in two axes which were perpendicular to one another. The measurement was repeated once. The arithmetic mean of all four measurements gives the flow index. The values obtained are shown in table 3.

TABLE 3

Flow index of the CEM I 42.5 R cement slurries treated with the polymers according to the invention

| Polymer | Flow index cm |
|---|---|
| — | 26.0 |
| methyl cellulose (reference) | 22.0 |
| 1 | 19.5 |
| 2 | 21.5 |
| 3 | 20.0 |
| 5 | 23.0 |

Example 9

The polymers according to the invention are suitable as water retention agents for plaster pastes. The water retention capacity of the plaster pastes treated with the polymers according to the invention was determined according to DIN 18 555. 350 g β-hemihydrate was mixed with 210 g tap water, 0.25 g Retardan®P (retarding agent for plasters from the Tricosal Company, Illertissen) and 2.5 g polymer and homogenized. The results obtained were compared with those for a commercial methyl cellulose. Results of the measurements are shown in table 4.

TABLE 4

Water retention capacity of the described polymers according to the invention in plaster pastes

| Polymer | Water retention capacity (%) |
| --- | --- |
| — | 73.2 |
| methyl cellulose (reference) | 98.7 |
| 1 | 95.2 |
| 2 | 95.1 |
| 3 | 98.2 |

Example 10

The thickening action of the polymers according to the invention in plaster paste was determined with the aid of a FANN rotation viscosimeter ($r_{rotor}$=1.8415 cm, $r_{stator}$=1.7245 cm, $h_{stator}$=3.800 cm, $d_{ring\ gap}$=0.1170 cm, instrument constant K=300.0 (spring F1)). A commercial methyl cellulose was chosen as a reference. 0.25 g Retardan®P (retarding agent for plasters from the Tricosal Company, Illertissen) and 0.75 g polymer were dissolved in 245 g tap water and subsequently 350 g β-semi-hydrate was stirred in. The viscosity of the plaster paste was subsequently measured at a shear gradient y of 10.2 s$^{-1}$. The values obtained are shown in table 5.

TABLE 5

Vicosities of the polymers according to the invention in plaster paste

| Polymer | Shear stress at y = 10.2 s$^{-1}$ Pa | Viscosity at y = 10.2 s$^{-1}$ mPas |
| --- | --- | --- |
| — | 6.1 | 350 |
| methyl cellulose (reference) | 7.6 | 440 |
| 1 | 11.2 | 650 |
| 2 | 15.8 | 910 |
| 3 | 8.2 | 470 |

Example 11

The thickening action of the polymers according to the invention on clay suspensions was determined with the aid of a FANN rotation viscosimeter ($r_{rotor}$=1.8415 cm, $r_{stator}$=1.7245 cm, $h_{stator}$=3.800 cm, $d_{ring\ gap}$=0.1170 cm, instrument constant K=300.0 (spring F1)). For this 10.0 g bentonite was suspended in 350 ml tap water and 0.75 g polymer was subsequently added. The vicosity of the bentonite suspension was subsequently measured at a shear gradient of 10.2 s$^{-1}$. The values obtained are shown in table 6.

TABLE 6

| Polymer | Shear stress at y = 10.2 s$^{-1}$ Pa | Viscosity at mPas |
| --- | --- | --- |
| — | 0.5 | 29 |
| 1 | 1.0 | 60 |
| 2 | 1.0 | 60 |
| 3 | 1.5 | 90 |

Example 12

The start and end of setting was determined according to Vicat (DIN EN 196-3). For this 500 g cement CEM I 42.5 R was mixed with 210 g tap water and 2.5 g polymer. The mixture was homogenized and the cement slurries were subsequently measured. A commercial methyl cellulose was measured as a reference. The measured setting times are shown in table 7.

TABLE 7

Start and end of setting determined according to DIN EN 196-3 of the cement slurries treated with the polymers according to the invention

| Polymer | Start of setting (h:min) | End of setting (h:min) |
| --- | --- | --- |
| — | 4:00 | 5:30 |
| methyl cellulose (reference) | 7:00 | 8:45 |
| 1 | 3:15 | 4:45 |
| 2 | 4:00 | 5:00 |
| 3 | 4:45 | 5:45 |
| 4 | 4:15 | 5:45 |

The invention claimed is:

1. Water-soluble copolymers based on olefinic sulfonic acids, characterized in that they contain a) 5 to 93 wt.-% structural units of formula (Ia) and/or (Ib)

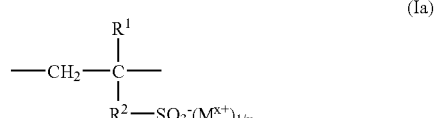

(Ia)

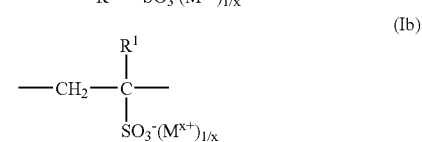

(Ib)

in which $R^1$=hydrogen or $C_1$–$C_5$ alkyl, $R^2$=$C_1$–$C_{20}$ alkylene, carboxy-$C_1$–$C_{20}$-alkylene, carboamido-$C_1$–$C_{20}$-alkylene or phenylene M=hydrogen, ammonium or a monovalent, divalent or trivalent metal cation and x=1 to 3 b) 1 to 50 wt.-% structural units of formula (IIa) and/or (IIb)

(IIa)

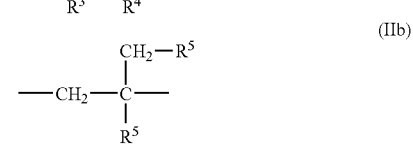

(IIb)

in which $R^3$ and $R^4$ =—COO⁻$(M^{x+})_{1/x}$ or are together

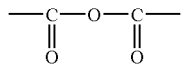

$R^5$ =—COO⁻$(M^{x+})_{1/x}$,

M=hydrogen, ammonium or a monovalent, divalent or trivalent metal cation and x=1 to 3 c) 5 to 93 wt.-% structural units of formula (III)

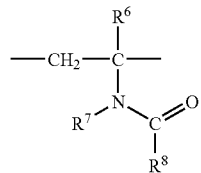

(III)

in which $R^6$=hydrogen or $C_1$–$C_5$ alkyl $R^7$ and $R^8$=hydrogen or $C_1$–$C_{10}$ alkyl or are together —$(CH_2)_y$—, and y=3 to 7 d) 1 to 25 wt.-% structural units of formula (IVa) and/or (IVb) and/or (IVc)

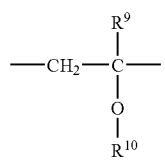

(IVa)

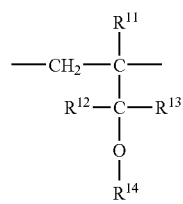

(IVb)

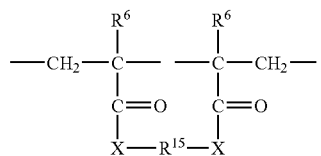

(IVc)

in which $R^9$ hydrogen or $C_1$–$C_5$ alkyl $R^{10}$=$C_1$–$C_{10}$ alkyl, $C_1$–$C_{10}$ aminoalkyl, $C_1$–$C_{20}$ hydroxyalkyl, $C_1$–$C_4$ alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl $R^{11}$, $R^{12}$ and $R^{13}$=hydrogen or $C_1$–$C_5$ alkyl, and $R^{14}$=hydrogen, $C_1$–$C_{20}$ alkyl, $C_1$–$C_{10}$ aminoalkyl, $C_1$–$C_{20}$ hydroxyalkyl, $C_1$–$C_4$ alkyl or hydroxyl-terminated mono- or poly-$C_2$–$C_3$-alkyleneoxy (containing 1 to 400 alkyleneoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or $C_1$–$C_{20}$ alkylenesulfonic acids optionally substituted with hydroxyl group(s) and ammonium, alkali or alkaline earth salts thereof

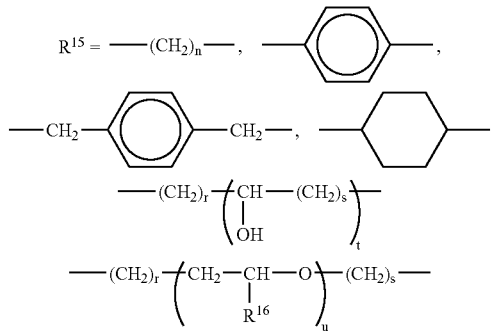

$R^{16}$=H, $CH_3$

X=O, NH n=1 to 6 r, s=0 to 5 t=1 or 2 u=1 to 50 and $R^6$ has the above-mentioned meaning and that the components a) to d) add up to 100 wt.-%.

2. Copolymers as claimed in claim 1, characterized in that $R^1$=hydrogen and $R^2$=—CO—NH—C$(CH_3)_2$—$CH_2$— in formula (Ia).

3. Copolymers as claimed in claim 1, wherein in formulae (Ia), (Ib), (IIa) and (IIIb) the monovalent metal cations denote alkali ions and in particular sodium and potassium ions, the divalent metal cations denote alkaline earth ions and in particular calcium and magnesium ions and the trivalent metal cations denote aluminum or iron ions.

4. Copolymers as claimed in claim 1, wherein y=3 to 5 in formula (III).

5. Copolymers as claimed in claim 1, wherein in formulae (IVa) and/or (IVb) the $C_1$–$C_{20}$ hydroxyalkyl, $C_7$–$C_{20}$ hydroxy-alkylaryl, $C_6$–$C_{10}$ hydroxylaryl residues for $R^{10}$ and $R^{14}$ have one or more hydroxyl groups.

6. Copolymers as claimed in claim 1, wherein, in formula (IVa) $R^9$ denotes hydrogen and $R^{10}$ denotes a $C_1$–$C_6$ hydroxyalkyl or a methyl-terminated or hydroxyl-terminated mono- or poly-$C_2$–$C_3$-alkyleneoxy residue.

7. Copolymers as claimed in claim 1, wherein, in formula (IVb), $R^{11}$, $R^{12}$ and $R^{13}$ denote hydrogen and $R^{14}$ denotes 2,3-dihydroxypropyl, 3-hydroxypropyl or 2-hydroxypropyl-3-sulfonic acid as well as ammonium, alkali and alkaline earth salts thereof.

8. Copolymers as claimed in claim 1, comprising 40 to 83 wt.-% structural units a), 5 to 48 wt.-% structural units b), 5 to 53 wt.-% structural units c) and 1 to 10 wt.-% structural units d).

9. Copolymers as claimed in claim 1, they have having a molecular weight of 10,000 to 3,000,000 g/mol.

10. Copolymers as claimed in claim 9, characterized in that the molecular weight is between 100,000 g/mol and 1,000,000 g/mol.

11. Process for producing the copolymers as claimed in claim 1, wherein monomers of formula (Ia) and/or (Ib)

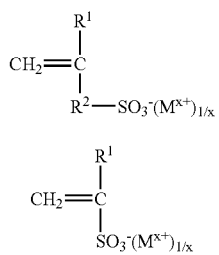  (Ia)

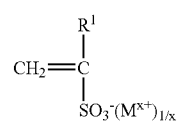  (Ib)

in which
R$^1$=hydrogen or C$_1$–C$_5$ alkyl,
R$^2$=C$_1$–C$_{20}$ alkylene, carboxy-C$_1$–C$_{20}$-alkylene, carboamido-C$_1$–C$_{20}$-alkylene or phenylene
M=hydrogen, ammonium or a monovalent, divalent or trivalent metal cation and
x=1 to 3,
and of formula (IIa) and/or (IIb)

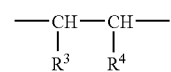  (IIa)

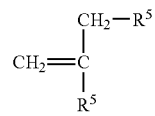  (IIb)

in which
R$^3$ and R$^4$=—COO$^-$(M$^{x+}$)$_{1/x}$ or are together

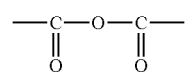

R$^5$=—COO$^-$(M$^{x+}$)$_{1/x}$
M=hydrogen, ammonium or a monovalent, divalent or trivalent metal cation and
x=1 to 3,
and
of formula (III)

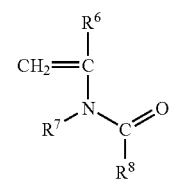  (III)

in which
R$^6$=hydrogen or C$_1$–C$_5$ alkyl
R$^7$ and R$^8$=hydrogen or C$_1$–C$_{10}$ alkyl or are together
—(CH$_2$)$_y$—
and
y=3 to 7, and
of formula (IVa) and/or (IVb) and/or (IVc),

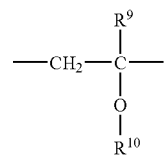  (IVa)

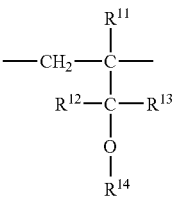  (IVb)

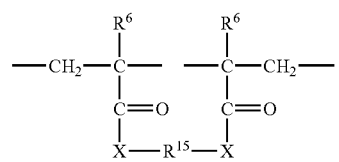  (IVc)

in which
R$^9$=hydrogen or C$_1$–C$_5$ alkyl
R$^{10}$=C$_1$–C$_{10}$ alkyl, C$_1$–C$_{10}$ aminoalkyl, C$_1$–C$_{20}$ hydroxyalkyl, C$_1$–C$_4$ alkyl or hydroxyl-terminated mono- or poly-C$_2$–C$_3$-alkyleneoxy (containing 1 to 400 alkyleneoxy units), C$_7$–C$_{20}$ alkylaryl, C$_7$–C$_{20}$ hydroxyalkylaryl, C$_6$–C$_{10}$ aryl, C$_6$–C$_{10}$ hydroxyaryl
R$^{11}$, R$^{12}$ and R$^{13}$=hydrogen or C$_1$–C$_5$ alkyl and
R$^{14}$=hydrogen, C$_1$–C$_{20}$ alkyl, C$_1$–C$_{10}$ aminoalkyl, C$_1$–C$_{20}$ hydroxyalkyl, C$_1$–C$_4$ alkyl or hydroxyl-terminated mono- or poly-C$_2$–C$_3$-alkyleneoxy (containing 1 to 400 alkyleneoxy units), C$_7$–C$_{20}$ alkylaryl, C$_7$–C$_{20}$ hydroxyalkylaryl, C$_6$–C$_{10}$ aryl, C$_6$–C$_{10}$ hydroxyaryl or C$_1$–C$_{20}$ alkylenesulfonic acids optionally substituted with hydroxyl group(s) and ammonium, alkali or alkaline earth salts thereof

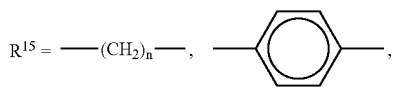

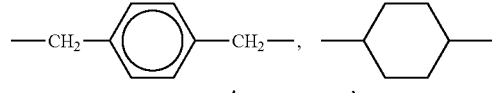

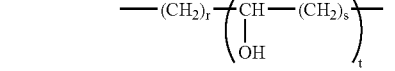

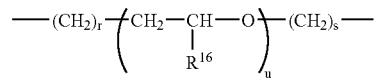

R$^{16}$=H, CH$_3$
X=O, NH
n=1 to 6
r, s=0 to 5
t=1 or 2
u=1 to 50 and

R⁶ has the above-mentioned meaning, are polymerized in bulk or in solution at temperatures of −5 to 120° C.

12. Process as claimed in claim 11, characterized in that an inverse emulsion polymerization is carried out in an organic solvent selected from the group comprising cyclohexane, toluene, heptane, benzene, petroleum ether or mineral oils in the presence of a protective colloid.

13. Process as claimed in claim 11, characterized in that a suspension polymerization is carried out in a continuous organic phase with the aid of a water-soluble initiator system.

14. Process as claimed in claim 11, characterized in that a precipitation polymerization is carried out using a water-soluble $C_1$–$C_5$ alcanol as a solvent.

15. Process as claimed in claim 11, wherein a gel polymerization is carried out in which the amount of monomer in an aqueous solution is 25 to 75% by weight.

16. Water retention agents for aqueous building material systems containing mineral binders, or for clay suspensions, comprising copolymers of claim 1.

17. The water retention agents of claim 16, comprising copolymers in an amount of 0.05 to 5% by weight based on the dry weight of the building material system.

18. Anti-segregation agents for aqueous building material systems containing mineral binders, or for clay suspensions, comprising copolymers of claim 1.

19. The anti-segregation agents of claim 18, comprising copolymers in an amount of 0.05 to 5% by weight based on the dry weight of the building material system.

20. A thickener for aqueous building material systems containing mineral binders, or for clay suspensions, comprising copolymers of claim 1.

21. The thickener of claim 20, comprising copolymers in an amount of 0.05 to 5% by weight based on the dry weight of the building material system.

* * * * *

UNITED STATES PATENT AND TRADEMARK OFFICE
CERTIFICATE OF CORRECTION

PATENT NO. : 7,202,319 B2
APPLICATION NO. : 10/510855
DATED : April 10, 2007
INVENTOR(S) : Christian Spindler et al.

Page 1 of 1

It is certified that error appears in the above-identified patent and that said Letters Patent is hereby corrected as shown below:

Column 13, line 58, after "$R^9$" insert -- = --.
Column 14, line 36, delete "(IIIb)" and insert --(IIb)-- therefor.

Signed and Sealed this

Tenth Day of July, 2007

JON W. DUDAS
*Director of the United States Patent and Trademark Office*